Aug. 19, 1952  J. H. WILSON  2,607,098
SLIP
Filed May 15, 1945  9 Sheets-Sheet 1
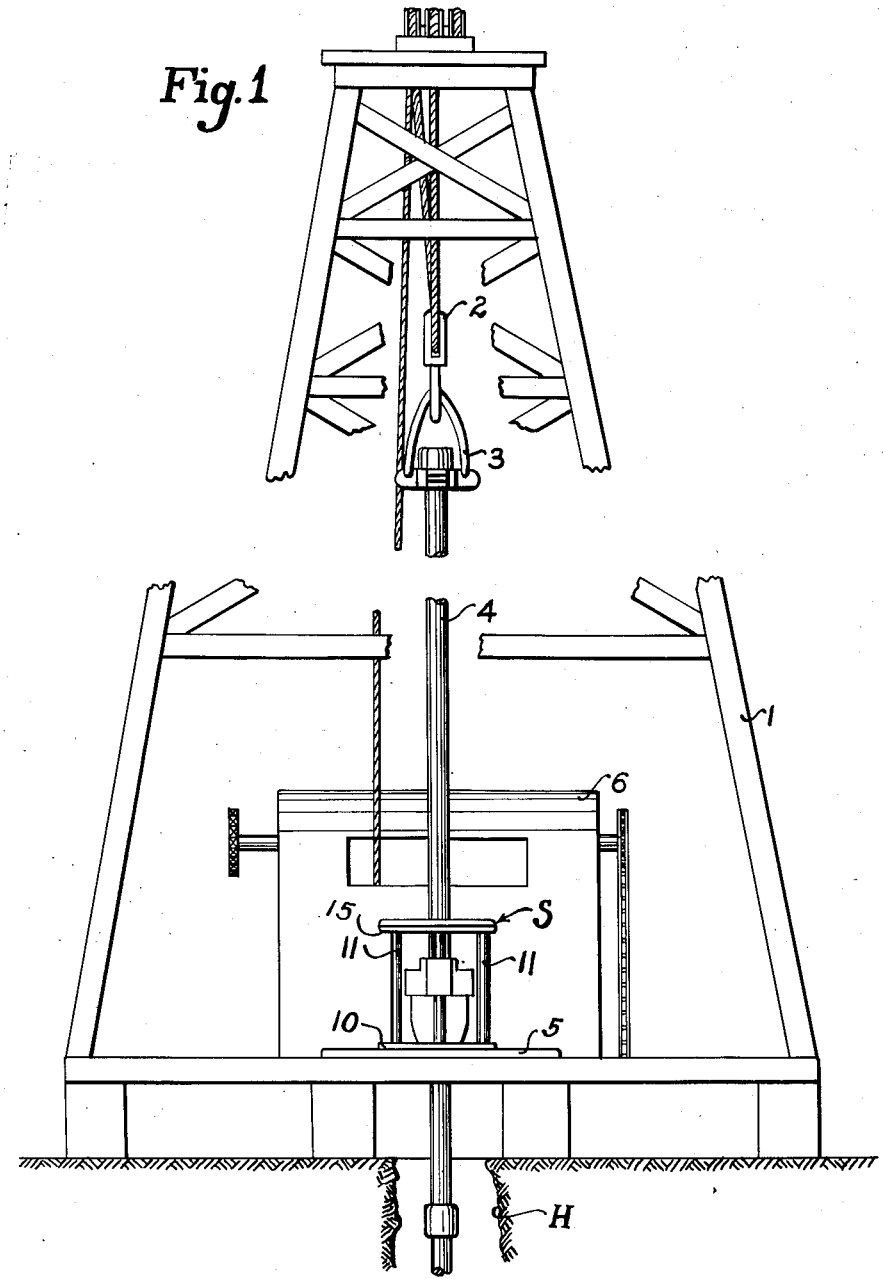
John Hart Wilson
INVENTOR.
BY
Wayland D. Keith
HIS AGENT.

Aug. 19, 1952 — J. H. WILSON — 2,607,098
SLIP
Filed May 15, 1945 — 9 Sheets-Sheet 2
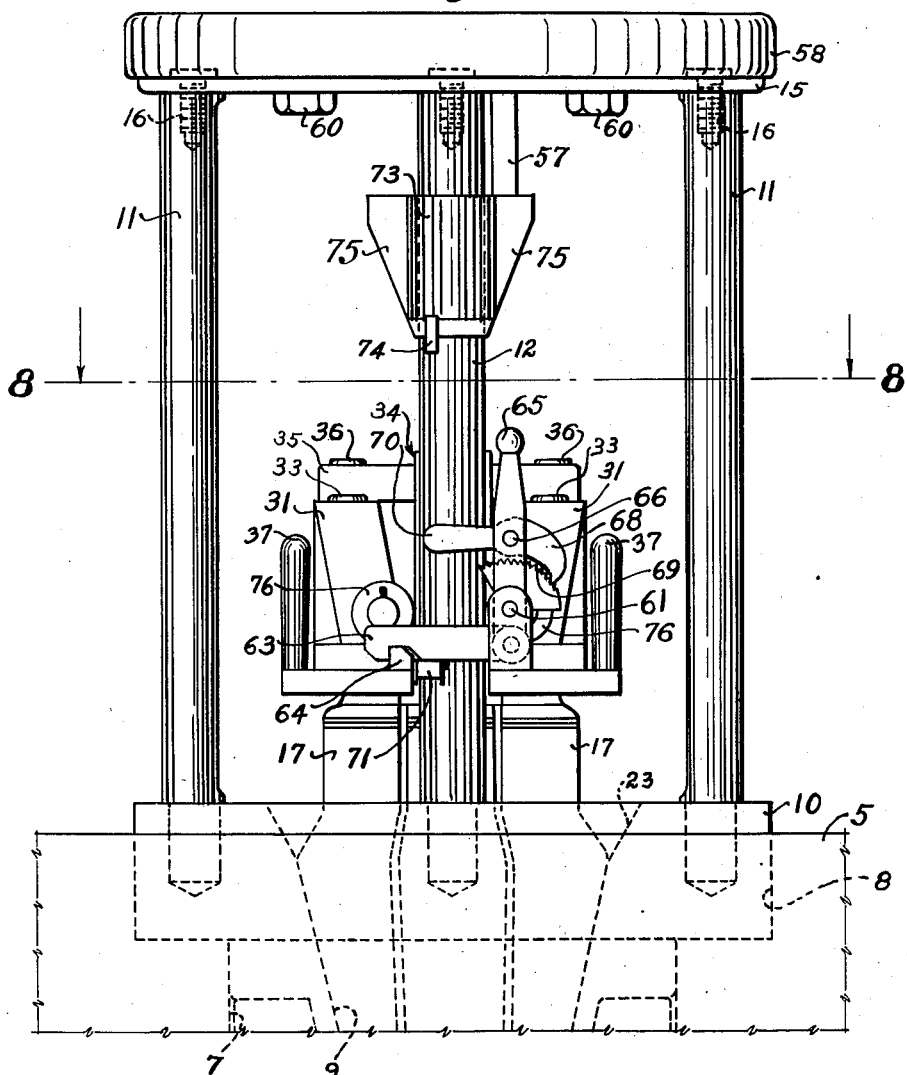
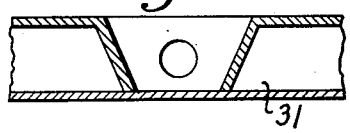
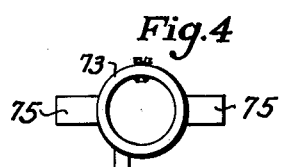
John Hart Wilson
INVENTOR.
BY Wayland D. Keith
HIS AGENT.

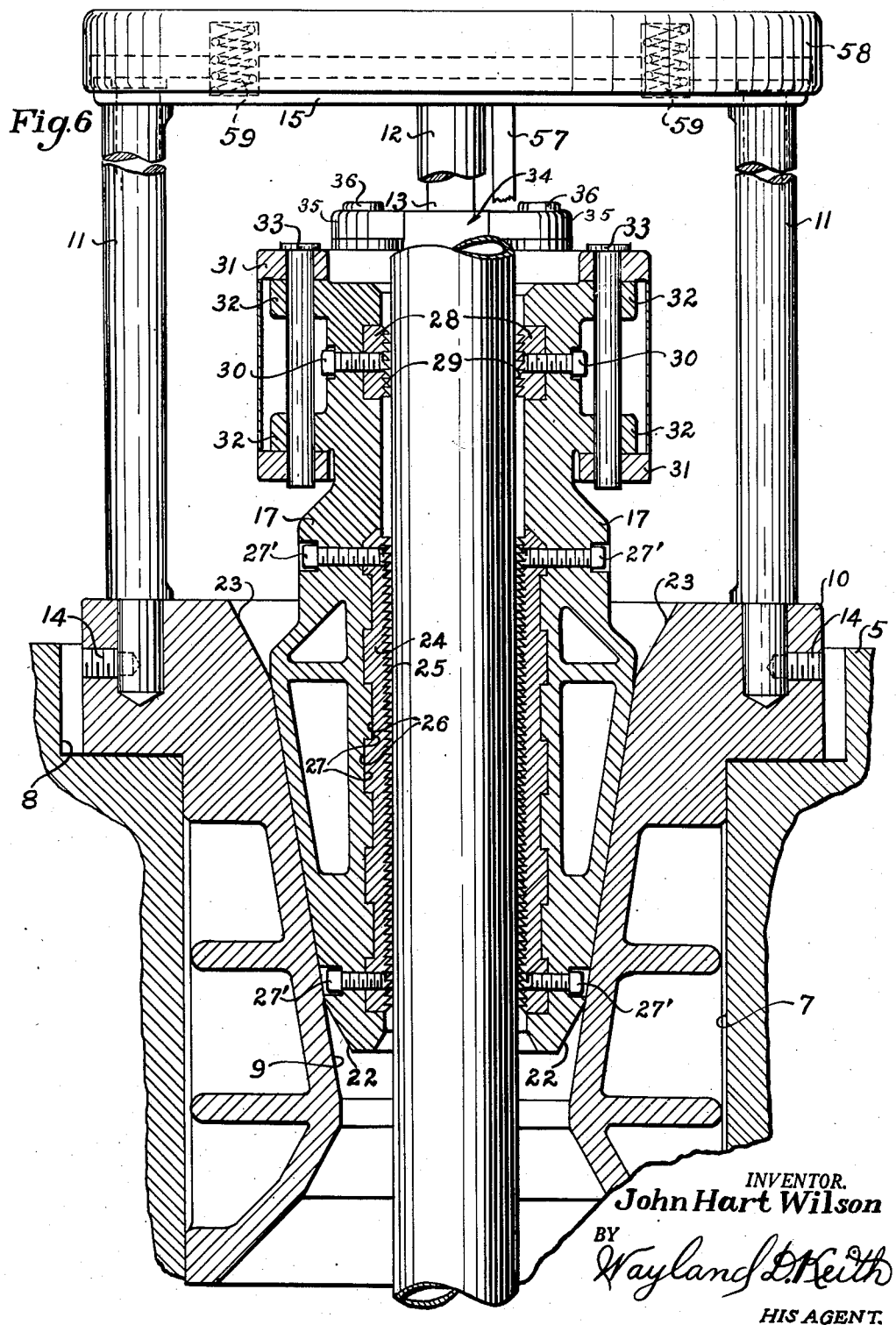

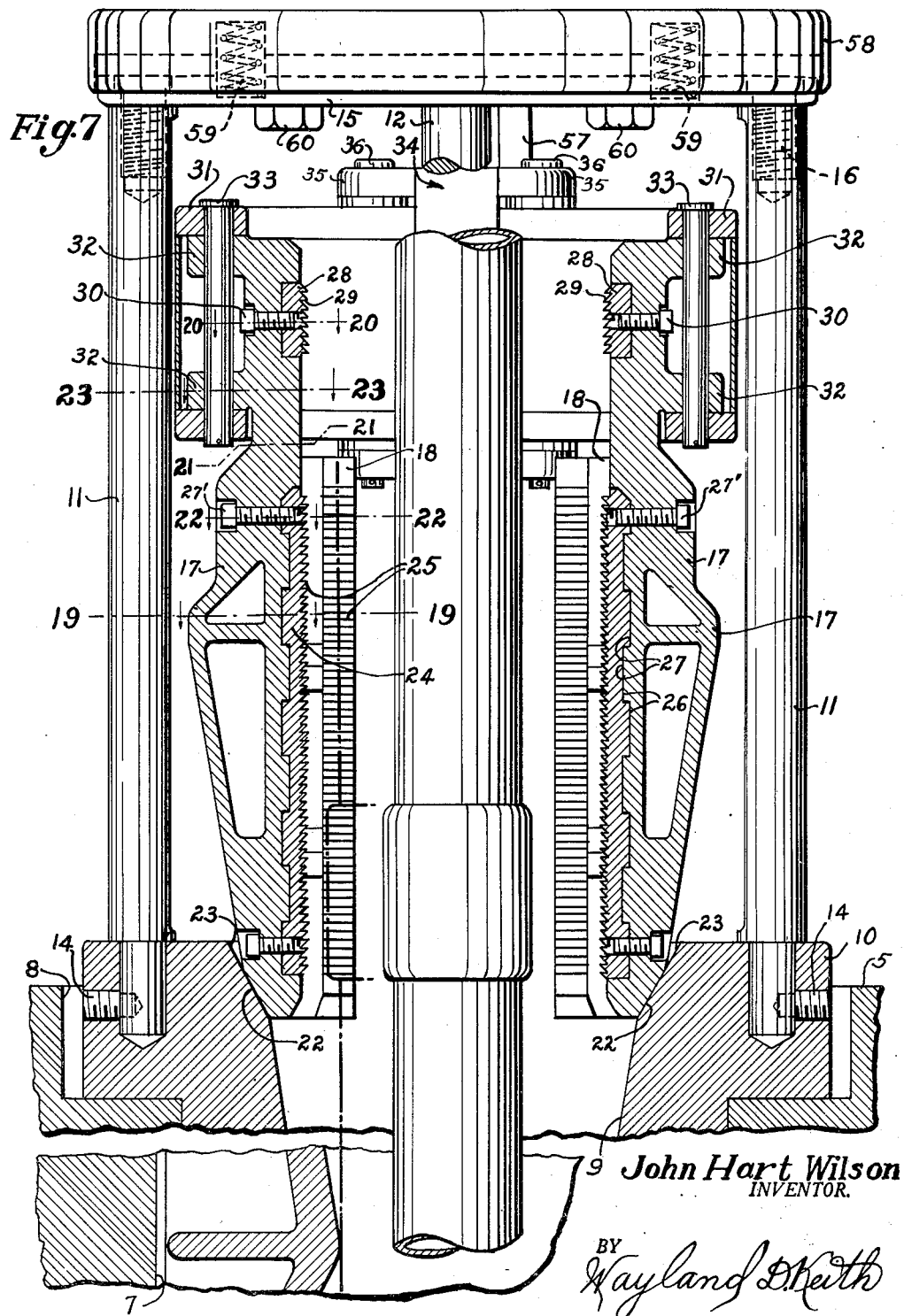

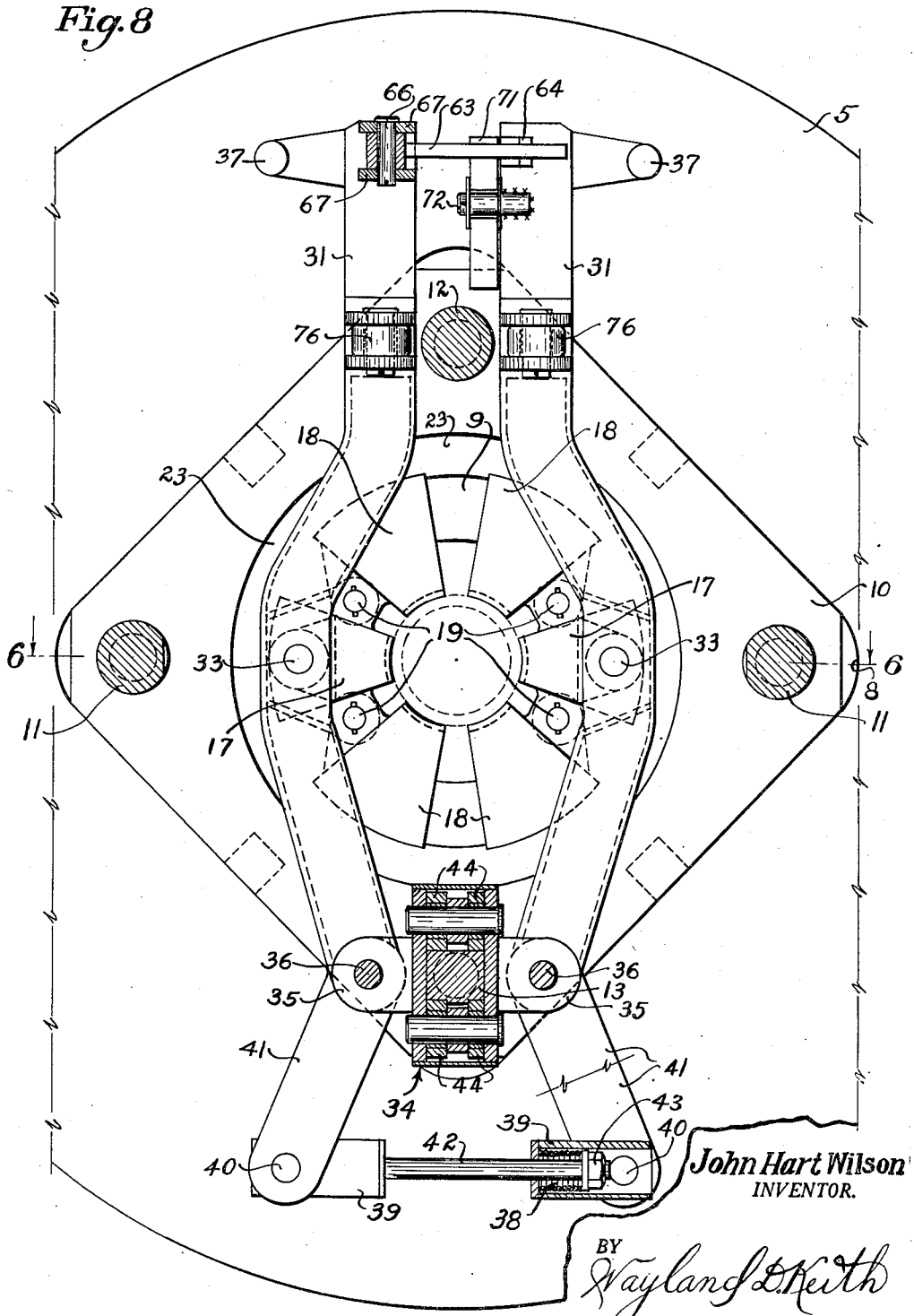

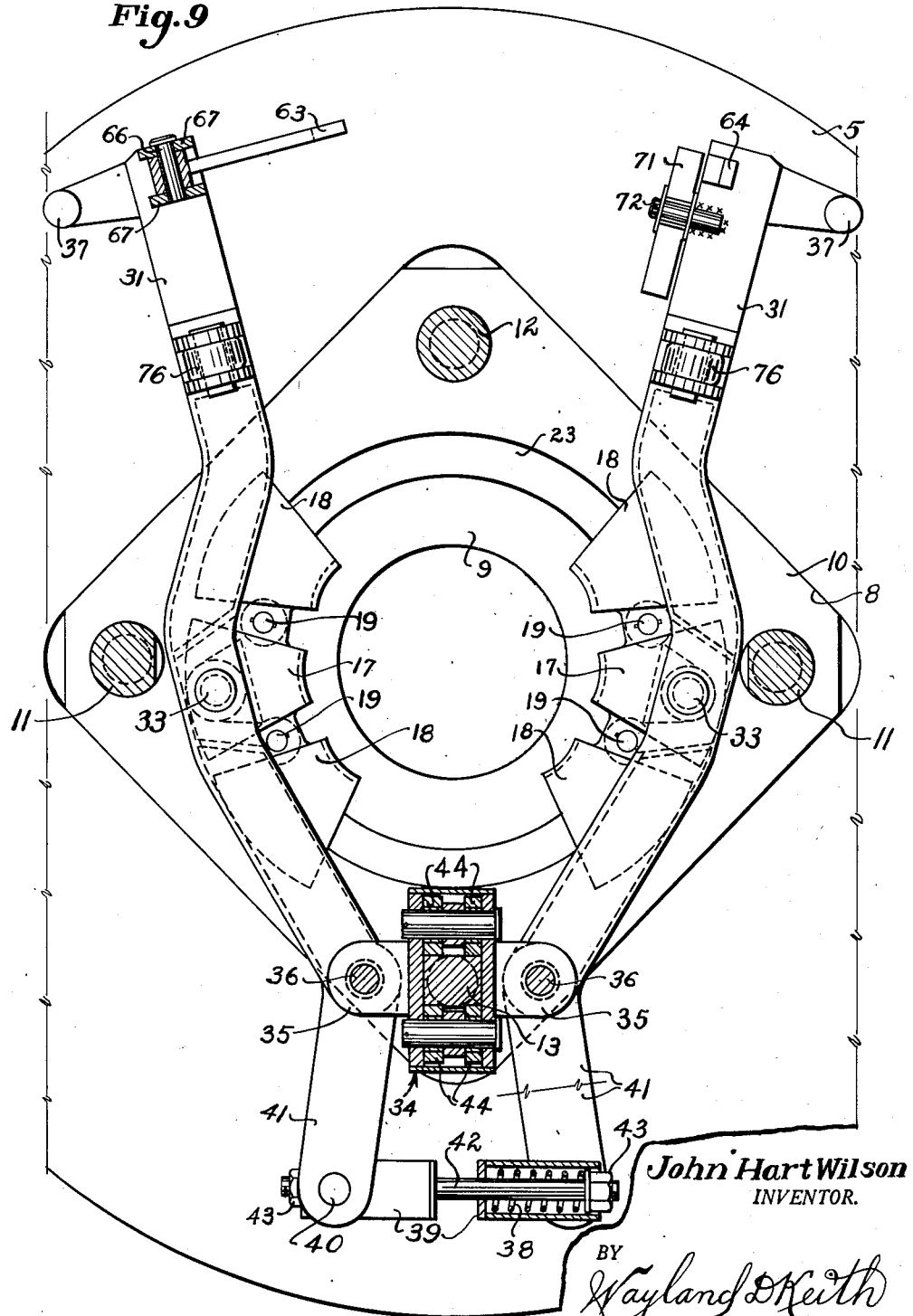

Aug. 19, 1952 J. H. WILSON 2,607,098
SLIP
Filed May 15, 1945 9 Sheets-Sheet 8
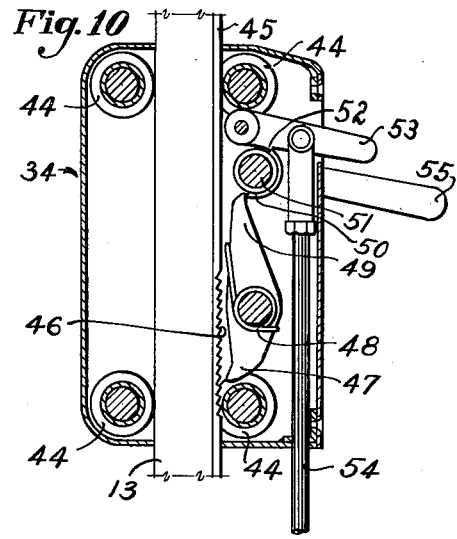
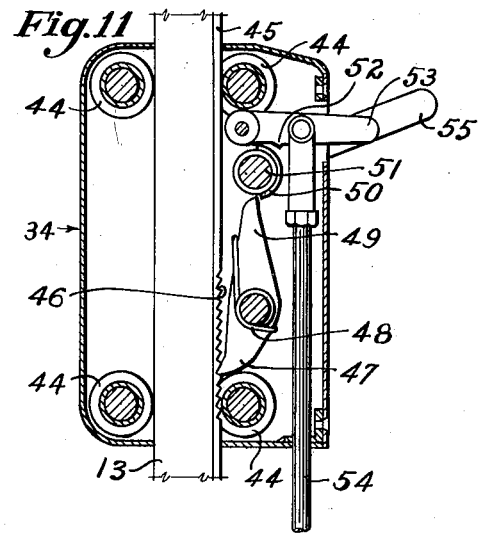
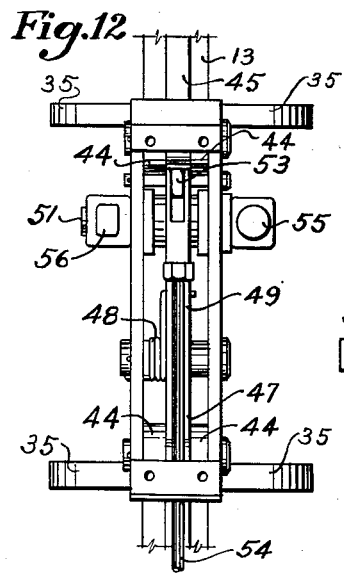
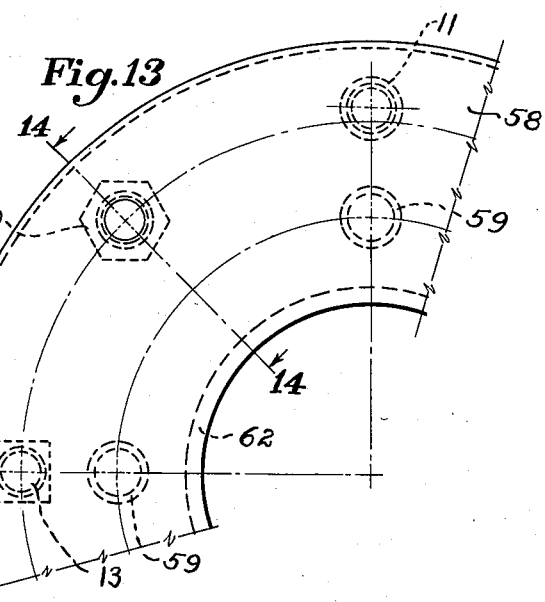
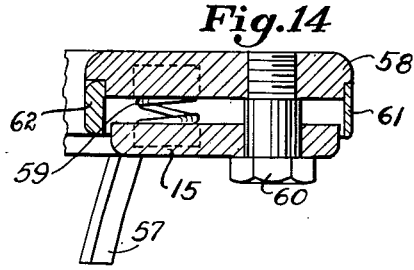
John Hart Wilson
INVENTOR.
BY Wayland D Keith
HIS AGENT.

Aug. 19, 1952     J. H. WILSON     2,607,098
SLIP
Filed May 15, 1945     9 Sheets-Sheet 9
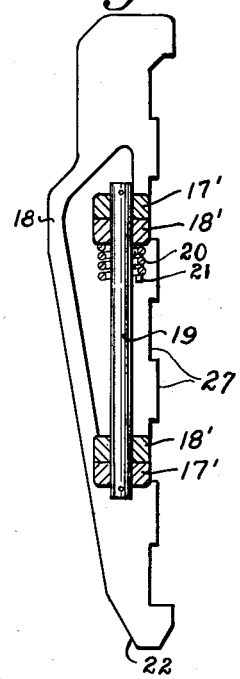
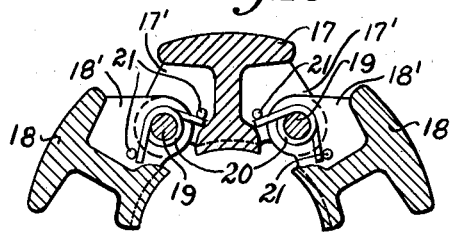
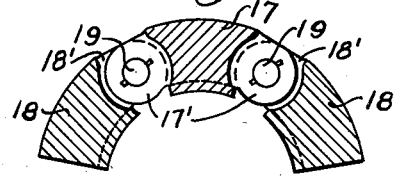
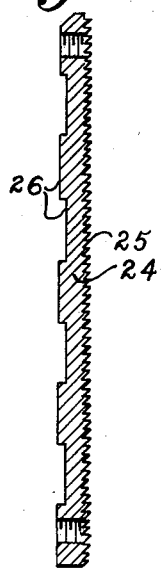
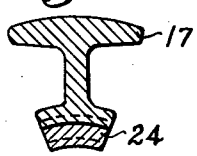
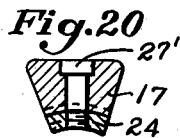
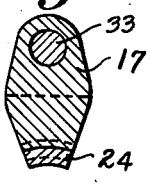
John Hart Wilson
INVENTOR.
BY Wayland D. Keith
HIS AGENT.

Patented Aug. 19, 1952

2,607,098

UNITED STATES PATENT OFFICE 2,607,098

SLIP

John Hart Wilson, Wichita Falls, Tex.

Application May 15, 1945, Serial No. 593,855

20 Claims. (Cl. 24—263)

This invention relates to improvements in slips for holding pipe and the like, and more particularly to such slip construction as is used to hold pipe for coupling or uncoupling, as such pipe is being lowered into or raised out of a well in connection with a drilling operation.

Various attempts have been made heretofore to provide for the semi-automatic operation of slips of this character, but such attempts, for the most part, have been unsatisfactory and ineffective because of the bulky and cumbersome structures provided and the difficulties encountered in the operation thereof.

The principal object of this invention is to improve the construction of slips of this character to provide for the practical and effective operation thereof in a semi-automatic manner, to enable the slips to be applied easily, and readily released from the pipe, and yet effective for engaging and holding a string of pipe while suspended in a bore hole of a well.

Another object of the invention is to provide for the automatic unlatching of the slips at a predetermined point during the ascent of the pipe, thereby releasing the grip on the pipe, and yet will grip the pipe effectively when automatically dropped into a slip-receiving bowl by the simple action of touching a trip lever.

These and other objects of the invention may be accomplished according to the preferred embodiment of the invention by providing automatic features of control which will enable the slips to be applied to the pipe for effective gripping action thereon and the gripping elements are so mounted with respect to the slip bowl as to be movable relative thereto in up and down relation in response to movement of the pipe and yet will effectively act to grip or release the pipe according to different automatic actions applied thereto.

This invention dispenses with the manual handling of the slips as they are caused to engage the pipe being withdrawn from a bore hole of a well and moved upward from the bowl of the slip spider to a released position. The structure has provision for maintaining the slips in such released position until it is desired to engage the pipe again. At this point, a lever may be tripped manually to release the slips and allow them to drop by gravity into wedging engagement with the pipe.

When it is desired to lower a pipe into the well while supported by the slips, the pipe may be raised for the automatic opening of the slips when the latter will be suspended on a supporting structure and held in released position. Then the pipe may be lowered into the well and when it has reached the desired lowered position, the slips may be released manually and caused to drop by gravity into an engaging position with the pipe where the pipe will be held effectively thereby. Provision is made for the automatic actuation of the slips to an engaging position, from a released position, in the event that the elevator should be lowered to the level of the slip assembly accidentally or otherwise, in order to prevent the possibility of dropping of the pipe in the well.

The preferred embodiment of the invention involves many improved features and constructions which will be set forth more in detail hereinafter, that cooperate to provide the improved operation referred to above. This preferred embodiment is illustrated in the accompanying drawings in which:

Fig. 1 is a diagrammatic side elevation of a conventional well drilling rig and rotary, showing the application of the slips thereto;

Fig. 2 is a side elevation of the slips from the front thereof showing the application thereof to a rotary table;

Fig. 3 is a detail cross section of an arm member thereof on the line 3—3 of Fig. 5;

Fig. 4 is a top plan view of a releasing wedge member;

Fig. 6 is a vertical sectional view through the slips at right angles to Fig. 5, substantially on the line 6—6 of Fig. 8, and with parts in elevation, the slips being in engaged position;

Fig. 7 is a sectional view similar to Fig. 6 with the slips in released position;

Fig. 8 is a horizontal sectional view on the line 8—8 in Fig. 2, the slips being in engaged position;

Fig. 9 is a similar view similar to Fig. 8 with the slips in released position;

Fig. 10 is a detail vertical section through the slip supporting carriage, showing the pawl in released position;

Fig. 11 is a similar view with the pawl in engaged position;

Fig. 12 is an edge view in elevation of the slip supporting carriage;

Fig. 13 is a fragmentary top plan view of the automatic head;

Fig. 14 is a cross section therethrough on the line 14—14 of Fig. 13;

Fig. 15 is a detail vertical section through a hinge joint of the slip members;

Fig. 16 is a transverse cross section through the slip body members taken below the torsion springs and looking upward, to show the details of construction;

Fig. 17 is a similar view to Fig. 16, but taken below the pivot pin and looking upward;

Fig. 18 is a detail longitudinal section through a slip jaw, detached;

Fig. 19 is a detail cross section through a slip jaw on the line 19—19 of Fig. 7;

Fig. 20 is a similar view on the line 20—20 of Fig. 7;

Fig. 21 is a similar view on the line 21—21 of Fig. 7;

Fig. 22 is a similar view on the line 22—22 of Fig. 7; and

Fig. 23 is a detail cross section through the slip handle member on the line 23—23 of Fig. 7.

Figure 5:
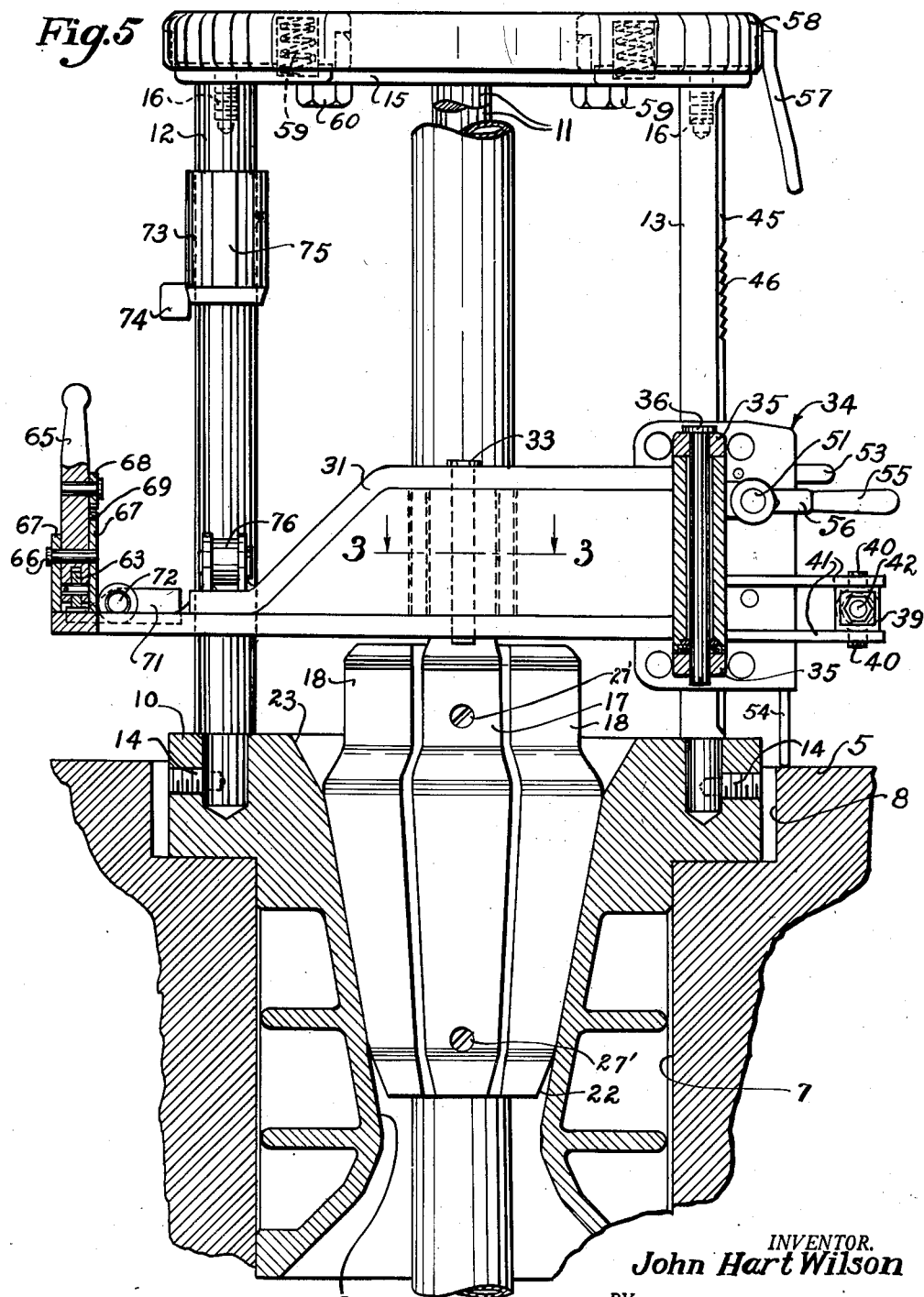
Fig. 5 is a side elevation of the slips at right angles to Fig. 2, with parts broken away and in section.

Referring to Fig. 1, the invention is shown as applied to a conventional derrick used in the drilling of deep wells, such as oil wells, for the raising and lowering of pipe in the bore hole of the well. This derrick is designated generally by the numeral 1, and is provided with a block and tackle structure 2, that supports the usual elevator 3 which carries the pipe 4 in raising and lowering the latter. The bore hole is designated generally at H.

The invention is described generally as applied to drill pipe merely for purpose of illustration, although it will be understood that it is applicable to pipe in general, and is not to be restricted to drill pipe.

The drill pipe is usually rotated during the drilling operation by a rotary table 5 which is operated by draw-works generally designated at 6 operated, in turn, by a power driving unit.

As the drilling operation progresses, it is necessary to lower additional sections of pipe into the well, coupling these successively to the drill pipe in the well. At other times, it may be desired to remove the pipe sections one by one from within the well. This improved slip device is provided for this purpose, generally indicated at S in Fig. 1, being supported upon the rotary table 5 and adapted to hold the successive pipe sections as they are lowered into or removed from the well.

The slip structure is shown more in detail in Figs. 2 to 23. As illustrated in Fig. 5, the rotary table 5, which is power driven, has an opening 7 therethrough for the passage of pipe into and out of the well. The upper end portion of this opening 7 is counter-sunk at 8. Extending into the axial opening 7 of the rotary table is a bushing 10 that is seated upon the rotary table within the counter-sink 8, and a slip bowl 9 is formed within the bushing 10.

In the illustrated embodiment the bushing 10 is square, and upstanding from the bushing 10 on diagonally opposite sides thereof are standards 11. A third standard 12 is disposed forward and approximately equidistant from the standards 11, while a supporting standard 13 is disposed diagonally opposite the standard 12, as shown in Fig. 8. The standards 11—13 have their lower ends secured rigidly to the bushing 10 by set screws 14 and cooperate to form a rigid frame-work supported thereby.

The upper ends of the standards 11—13 are connected by a ring 15 which is fixed upon the ends of the standards by screws 16 threaded therein through the ring. This ring serves to brace the upper ends of the standards and hold them in rigid relationship with respect to each other for mounting and operation of the slips suspended within this frame.

The slips are arranged in pairs on diametrically opposite sides of the central opening of the slip bowl 9. As shown in Figs. 5, 8, 9, 16 and 17, the slips on each side comprise a plurality of slip elements arranged for relative swinging motion about vertical axes and are adapted to be inserted in the slip bowl 9 to the position shown in Figs. 5, 6 and 8, or to be withdrawn therefrom as shown in Figs. 7 and 9.

Each set of slips comprises a main slip body element 17 and lateral slip elements 18 pivotally connected together by pivot pins 19 which extend through ears 17' and 18' on the respective elements, as shown in Figs. 15 and 16. Sleeved over the pivot pins 19 are torsion springs 20 having opposite ends anchored at 21 to the respective slip elements, normally tending to spread these elements apart to the expanded condition shown in Fig. 9, except when compressing action is applied thereto by the downward inclination of the slip bowl 9 upon insertion of the slips into the bowl as shown in Figs. 5 and 6. The slip elements are guided into the bowl by the provision of tapered lower ends 22 formed thereon (Figs. 6 and 7), which engage an inner beveled edge 23 provided at the upper end of the slip bowl 9, as shown in Figs. 6 and 7. These beveled portions 22 and 23 cooperate to guide the slips into the bowl and to compress the same around the pipe which is inserted in the hole of the well.

Each of the slip elements 17 and 18 is provided with a separately formed holding jaw 24 having upwardly inclined teeth 25 on the inner face thereof. The outer face of the jaw 24 is provided with alternate notches and ribs generally designated at 26 to interfit with a complementary notched portion 27 formed on the inner face of each slip element 17, 18 to maintain the parts in proper relation with each other as illustrated in Fig. 7. The jaw 24 is secured to each slip element by cap screws 27' which extend through the slip element and are threaded into the upper and lower end portions of the jaw as shown.

The middle slip element 17 extends upward materially beyond the upper end of each of the lateral elements 18, as shown in Figures 5 and 7. This slip element 17 is provided with an auxiliary jaw 28 having inwardly directed jaw teeth 29 inclined downwardly, i. e. in the opposite direction to the teeth 25, so as to bindingly engage the pipe in order that the slip elements 17 and 18 will move upward with the pipe when the slips are compressed about the pipe. The auxiliary jaws 28 are secured to the upper ends of the slip elements 17 by cap screws 30 threaded therein. The cap screws 27' and 30 are removable when desired for detachably securing the jaw members 24 and 28 to the slip elements, whereby these jaw members may be readily replaced or the teeth thereof sharpened when desired.

The slip elements are suspended by a pair of supporting arms 31 which are arranged in embracing relation with respect to the pipe as shown in Figs. 7 to 9. Each of the arms 31 has a bifurcated portion that embraces spaced lugs 32 extending outwardly from the upper end portion of the slip body element 17 as shown in Figs. 6 and 7. A pivot pin 33 extends through the bifurcated portion of the supporting arm 31 and through the lugs 32, so as to pivotally connect the slip element 17 with the supporting arm 31, suspending each set of slips by the corresponding arm.

The supporting arms 31 are suspended in turn by a movable carriage generally designated at 34 which is in the form of an enclosed casing as shown in Figs. 9 to 12. The carriage 34 is provided with the pairs of lateral ears 35 on opposite sides thereof and in spaced relation, and between the ears of each pair is received the end of one of the supporting arms 31. Each arm is pivotally connected with the carriage 34 by a pivot pin 36 that extends through the adjacent ears 35 and through a bushing 31' on the arm 31, so as to form a pivotal support on the arm for the carriage.

In this way, the supporting arms 31 are pivotally mounted on opposite sides of the carriage 34 for opening and closing swinging movements with respect thereto between the positions shown in Figs. 8 and 9. The opening or closing movements may be facilitated by handles 37 on the free ends of the arms. Normally, however, provision is made for urging the arms apart as shown in Fig. 9.

This outward movement of the arms 31 is provided by compression springs 38, one for each arm 31, and housed within a sleeve 39. The sleeve 39 is provided with trunnions 40 on opposite sides thereof forming a pivotal connection between the sleeve 39 and spaced fingers 41 rigidly fixed to the pivoted end portions of the arms 31. A guide bolt 42 extends loosely through the sleeves 39 and has adjusting nuts 43 on the opposite outer ends thereof for confining the springs 38 within the sleeves. Thus the expanding action of the springs 38 will act against the inner ends of the sleeves 39 tending to draw the fingers 41 toward each other, thereby swinging the free ends of the arms 31 laterally, spreading apart the sets of slip elements, as shown in Fig. 9.

The carriage 34 is guided upon the standard 13 which is substantially rectangular in cross section. The carriage 34 is provided with guide rollers 44 journaled therein in position to bear against opposite faces of the standard 13, as shown in Figs. 9 to 11, whereby the carriage may be guided in up and down movement with respect to the standard, thereby lifting the supporting arms 31 and slip elements relative to the slip bowl 9.

The outer face of the standard 13 has a rib 45 thereon provided with ratchet teeth 46 at a point in the length of the standard where the carriage 34 may be held in its upper supporting position, as shown in Figs. 5, 10 and 11. A pawl 47 is pivotally mounted in the carriage 34 in position to engage the ratchet teeth 46 when the carriage is moved to its elevated position to secure the same in this position. A torsion spring 48 acts on the pawl 47 tending to hold this pawl in position for engaging the ratchet teeth. The pawl 47 is pivotally mounted on the carriage so as to anchor the carriage in set position with respect to the standard 13.

The upper end of the pawl 47 is provided with an arm 49 for actuation of the pawl by a cam portion 50 that is fixed on the periphery of a shaft 51 journaled in the carriage 34 and extending transversely thereof to points externally of the carriage. The cam portion 50 has abrupt shoulders substantially on diametrically opposite sides of the shaft 51. One of these shoulders is in position to engage the pawl actuating arm 49 to hold the pawl out of engagement with the ratchet teeth 46 when the shaft 51 is turned to the position shown in Fig. 10, or to permit engagement therewith when the shaft is turned to the position in Fig. 11.

The other shoulder of the cam portion 50 is in position to engage an off-set 52 provided on one edge of a lever 53, that is pivotally mounted in the carriage and disposed just above the shaft 51. The end of the lever projects to a point externally of the carriage for manual actuation thereof when desired, and the lever 53 also carries a depending rod 54 that extends downwardly through the bottom of the carriage in position to engage the top face of the bushing 10 when the carriage is in its lowered position as shown in Fig. 5. The off-set 52, engaging the cam portion 50, normally holds the shaft 51 against turning movement under the action of the torsion spring 48, thereby locking the pawl 47 in its released position as shown in Fig. 10. However, when the lever 53 is lifted, as shown in Fig. 11, the cam portion 50 is released and allows the pawl 47 to swing into position for engagement with the ratchet teeth 46 when the carriage is moved to the elevated position shown.

The shaft 51 may be turned also by a lever 55 on one end thereof adapted for manual actuation, or automatically by a tripping arm 56 on the opposite end thereof, as shown in Figs. 5 and 12.

The arm 56 is arranged in position to be engaged by a depending trip finger 57 rigidly fixed to a movable ring 58 (Figs. 5, 13 and 14). The ring 58 is concentric with the ring 15 but is normally held in spaced relation therewith by a plurality of coiled compression springs 59 which are interposed therebetween. The relative separation of the rings is limited by guide screws 60 passed loosely through the ring 15 and threaded into the ring 58 in the form shown. The space between the rings 15 and 58 is confined within outer and inner walls 61 and 62 that overlap the inner edges of the rings and exclude mud, dirt and foreign matter therefrom for freedom of relative movement of the rings.

The rings 15 and 58 are positioned sufficiently far apart and have sufficient relative movement so that when the carriage 34 is in its elevated position, the depending trip finger 57 moving downward with a depression of the ring 58 will depress the arm 56 sufficiently to move the pawl 47 out of engagement with the ratchet teeth 46 and thus release the slips from their elevated position, allowing them to drop into the bowl 9 in engagement with the pipe. This is desirable in the event that the elevator should drop too far with the pipe suspended thereby and allow the pipe to fall in the well, whereby the slips will act automatically to engage the pipe and hold it in the rotary table.

The supporting arms 31 are adapted to be locked in secure position with the slips in engagement with the pipe by latch 63 carried by one of the supporting arms in position to engage a catch 64 carried by the other arm, at the free ends thereof, as shown in Figs. 2, 8 and 9. The latch 63 is pivotally supported on the lower end of a lever 65 which in turn is pivotally mounted at 66 within a pair of upstanding lugs 67 formed on the upper face of one of the arms 31. The lever 65 is adapted for lateral swinging movement and will move the latch 63 transversely of the length of the supporting arms 31, whereby the free ends of these arms may be drawn toward each other by the swinging movement of the lever 65 to cause the slips to bindingly engage the pipe 4. The arms may be held in latched relation by a dog 68 pivoted on the lever 65 in position to engage a ratchet segment 69 fixed on one of the lugs 67, as shown in Figs. 2 and 5. The dog 68 has a laterally projecting end 70 adapted to be moved for releasing the dog from the ratchet segment 69 when desired.

The latch 63 is adapted to be released by a trigger 71 pivotally mounted at 72 on a side of the supporting arm 31 that carries the catch 64. One end of the trigger 71 projects in position to underlie the latch 63 while the opposite end of said trigger 71 projects toward the standard 12, as shown in Figs. 5 and 8.

The standard 12 carries a trigger release 73 fixed thereon at a point adjacent the upper end of the standard to release the supporting arms from their latched relation when these arms are moved upward with the pipe to an elevated position with respect to the rotary table 5. The trigger release 73 carries a projection 74 at one side thereof in position to engage the adjacent end of the trigger 71, while wedge-shaped projections 75 on the release member 73, at right angles to the projection 74, are in position to engage rollers 76 journaled on the upper faces of the respective supporting arms 31 near the free ends thereof, these rollers being thus disposed on opposite sides of the standard 12, as shown in Figs. 5 and 8. Thus, when the arms are moved with the pipe to their elevated positions and the latch 63 is released by the trigger 71, the free ends of the arms will be moved apart by the spreading action of the wedge-shaped projections 75.

In the operation of the slips, the device is normally seated in the central opening in the rotary table 5, substantially as shown in Figs. 2, 5 and 8, in position to surround the pipe as the latter is supported in the rotary table, as the pipe is moved upward or downward relative thereto. It is customary to disconnect one joint of pipe from the drill stem or to connect the joints of pipe one by one therewith in running the pipe out of or into the well. The slips are adapted for supporting the drill stem in the well during such connection or disconnection of the joints of pipe, while holding the drill stem in secure supported position in the well. During movement of the pipe into or out of the well, the slips are retained and held in elevated position with respect to the rotary table, released from the pipe as shown in Fig. 7.

When it is desired to hold the pipe against downward movement by a gripping action thereon, so another joint of pipe may be added thereto, or the joint disconnected therefrom, the operator swings the lever 55 downward from the position shown in Fig. 11, to the position shown in Fig. 10, which rotates the shaft 51 to cause the cam portion 50 to press inward on the arm 49 and move the pawl 47 out of engagement with the ratchet teeth 46. This releases the carriage 34 from its supported connection with the standard 13, and allows the carriage to move downward along the standard, thereby moving the supporting arms 31 and the slips carried thereby to their lower positions. The tapered seat in the slip bowl 9 will guide the slip elements 17—18 inwardly into embracing and secure relationship on the pipe, causing the teeth 25 of the jaws to engage securely upon the pipe and hold the latter rigidly in the rotary table. The inward movement of the slip elements into the tapered bowl 9 will cause the supporting arms 31 to swing inwardly to the relative positions shown in Fig. 8. This action will cause the latch 63 to engage the catch 64 and thus lock the supporting arms in this relation until the catch is released.

After the proper connection has been made and it is desired to lower another joint of pipe into the bore hole, the operator swings the lever 65 to the left which will draw the free ends of the supporting arms and the supported slip members tightly together about the pipe 4 and thus grip the pipe securely so that the slips will be moved upwardly when the pipe is raised. After the assembly has moved upwardly a predetermined distance within the frame comprising the posts 11, 12 and 13, the slips are adapted to be automatically disengaged from the pipe, by means to be presently described; and then the pipe, free from the slips, may be lowered into the well.

In effecting this pipe lowering operation, the operator moves the elevator 3 upward, thereby raising the pipe 4 a short distance. The downwardly inclined teeth 29 will engage the pipe 4 and cause the slips to ride upward with the pipe until the projection 74 engages the trigger 71 and forces open the latch 63. At this point, the pawl 47 will have engaged the ratchet teeth 46, so as to hold the slips in the elevated position, released from the pipe. After the latch 63 is released the compression springs 38, under tension, swing the arms 31 apart, and if the slips should move upward further, after the latch 63 is disengaged, the wedge members 75 will engage the rollers 76 to positively and forcibly spread the arms 31 apart. Thereafter, the pipe may be lowered into the well free of the slips, to the desired point for connection of another joint therein, when this operation may be repeated for supporting the pipe again by the slips.

Normally the lever 55 is pushed downward manually to release the pawl 47 from its elevated position and thereby to lower the slips into engagement with the pipe. If through oversight on the part of the operator or because of some failure of the mechanism, the pipe and elevators should drop downward, the elevator would strike the top of the trip ring 58 which would cause the trip finger 57 to engage the arm 56. This would turn the shaft 51 to release the pawl 47 and thereby allow the supporting arms to drop and the slips to engage with the pipe and support the latter. This would prevent the loss of the pipe in the well and would insure automatic holding of the pipe against dropping too far.

In removing pipe from the well, substantially this same operation is reversed. With the slips engaged with the pipe, they will move upward upon lifting movement of the pipe until the projection 74 engages the trigger 71 which will release the latch 63. This will disconnect the free ends of the supporting arms 31 and allow these arms to swing open either under the tension of the springs 38 or by being forced apart by the wedge projections 75 or both. When the slips are thus opened in this elevated position, the pawl 47 is in engagement with the ratchet teeth 46. The slips will be held, therefore, in supported position on the standard 13. The pipe will continue to move upward therethrough until the coupling is sufficiently above the slips to permit ready disconnection. Then upon the lever 55 being depressed by the operator, the slips will be released from their elevated position and will drop into the slip bowl 9 and into engagement with the pipe, holding this securely in the well.

It will be evident that upon lowering the slips into engaged position, the rod 54 will engage the upper surface of the rotary table 5 and move the lever 53 upward to the position shown in Fig. 11. This releases the cam projection 50 which in turn releases the pawl 47 to allow the pawl to bear upon the edge of the rib 45 in position for engaging the ratchet teeth 46 when the slips are again moved to their elevated positions.

It will be evident from Fig. 7 that the slips are opened wide enough to clear the pipe couplings as well as to permit the pipe to move from one side of the axial opening of the slip bowl 9 to the other without causing the pipe or pipe couplings to engage the teeth of the slips, as is best illustrated by the dot-dash outline.

The detachable connection of the slip jaws 24 and 28 enables these to be replaced when they become worn or for sharpening. They may be replaced also by jaws of different sizes or characters as desired.

While the invention has been described in some detail as applied to a rotary drilling rig, it is to be understood that it is applicable equally to the lowering or raising of any kind of pipe in the bore hole of a well, by using any conventional type of slip spider, to be used when a rotary table is not employed.

I claim:

1. A pipe gripping mechanism, the combination of a body having a tapered axial opening therein, a standard mounted on the body at one side of said opening, a pair of frame members supported on the standard for vertical reciprocating and lateral swinging movement relative thereto and having latch means positioned thereon, said latch means including releasing means, slip members mounted on said frame members and movable therewith, said latch means bindingly securing said frame member together to cause said slip members to engage the pipe while said pipe is being raised from the bore hole of a well, and a second standard mounted on the body substantially on the opposite side of the opening from the first-mentioned standard and carrying a projection in the path of said releasing means for releasing the latch means upon raising said pipe.

2. A pipe gripping mechanism, the combination of a body having a tapered axial opening therein, a standard mounted on the body at one side of said opening, a pair of frame members supported on the standard for lateral swinging movement relative thereto and having latch means positioned thereon, slip members mounted on said frame members and movable therewith, said latch means bindingly securing said frame member together to cause said slip members to engage the pipe while said pipe is being raised from the bore hole of a well, a second standard mounted on the body substantially on the opposite side of the opening from the first-mentioned standard and carrying a projection in position for releasing the latch means upon raising said pipe, and means for swinging said frame members open upon release of said latch means.

3. A pipe gripping mechanism, the combination of a body having a tapered axial opening therein, a standard mounted on the body at one side of said opening, a pair of frame members supported on the standard for lateral swinging movement relative thereto and having latch means positioned thereon, slip members mounted on said frame members and movable therewith, said latch means bindingly securing said frame member together to cause said slip members to engage the pipe while said pipe is being raised from the bore hole of a well, a second standard mounted on the body substantially on the opposite side of the opening from the first-mentioned standard and carrying a projection in position for releasing the latch means upon raising said pipe, and means for positively swinging said frame members open in opposite directions upon release of said latch means.

4. A pipe gripping mechanism, the combination of a body having a tapered axial opening therein, a standard mounted on the body at one side of said opening, a pair of frame members supported on the standard for lateral swinging movement relative thereto and having latch means positioned thereon, slip members mounted on said frame members and movable therewith, said latch means bindingly securing said frame member together to cause said slip members to engage the pipe while said pipe is being raised from the bore hole of a well, a second standard mounted on the body substantially on the opposite side of the opening from the first-mentioned standard and carrying a projection in position for releasing the latch means upon raising said pipe, and wedge means carried by one of said standards in position for engaging said frame members for positively swinging said frame members apart to release said slips from said pipe.

5. A pipe gripping mechanism, the combination of a body having a tapered axial opening therein, a standard mounted on the body at one side of said opening, a pair of frame members supported on the standard for lateral swinging movement relative thereto and having latch means positioned thereon, slip members mounted on said frame members and movable therewith, said latch means bindingly securing said frame member together to cause said slip members to engage the pipe while said pipe is being raised from the bore hole of a well, a second standard mounted on the body substantially on the opposite side of the opening from the first-mentioned standard and carrying a projection in position for releasing the latch means upon raising said pipe, rollers carried by the frame members, and wedge members for engaging the rollers on said frame members for positively swinging said frame members open to release said slip members from said pipe.

6. In a pipe gripping mechanism, the combination of a body having a tapered axial opening therein, a standard mounted on the body at a side of said opening, a pair of frame members supported on the standard for vertical reciprocating and lateral swinging movement relative thereto, slip members mounted on said frame members and movable therewith, latching means comprising interengaging elements on said frame members for securing the latter together, means for tightening the engagement of said latch elements after the initial engagement thereof, for bindingly securing said slip members to the pipe while said pipe is being raised, said latching means including releasing means, means fixed with respect to said standard, disposed in the path of upward movement of said releasing means, and adapted to be contacted thereby upon a predetermined upward movement of the pipe for positively releasing said latch to permit the release of said slip members from the pipe, and resilient means for imparting lateral swinging movement to said frame members to open same upon release of the latch member.

7. In a pipe gripping mechanism for use with rotary well drilling equipment having a pipe, an elevator, and a rotary table having an axial opening therein, the combination of a bushing adapted to engage in said axial opening and which bushing has a tapered opening therein, an upright standard mounted on top of said bushing, segmental slips having a complementary outer taper co-acting with the taper of said bushing to engage said slips wedgingly with said pipe, a mechanism for supporting the slips on said standard in elevated position, means for releasing said slips from said upright standard, a member resiliently mounted on top of said standards, means mounted on said member and in position to engage the slip release mechanism to drop said slips into said tapered axial opening upon movement of said member downward by engagement of the elevator with the member.

8. In a pipe gripping mechanism for gripping a pipe, the combination of a body adapted to fit within an opening of a rotary table of a well drilling apparatus, said body having a tapered axial opening therein, a standard mounted on said body at one side of said opening, a pair of frame members mounted for sliding action on said standard and supported on said standard for lateral swing movement relative thereto, slip members pivotally mounted on said frame members and supported thereby, and movable therewith, said slip members having sets of teeth thereon, which teeth are arranged with the bite of the respective sets in opposed relation, means for securing said frame members together to cause normal engagement of both sets of teeth with said pipe, one set of said teeth being adapted to more tightly engage with said pipe upon engagement of said slips with said tapered axial opening so as to prevent further downward movement of said pipe, the other set of teeth being positioned to engage more firmly with the pipe upon upward movement of said pipe to cause a lifting action of said slips with said pipe.

9. In a pipe gripping mechanism for gripping a pipe, the combination of a body adapted to fit within an opening of a rotary table of a well drilling apparatus, said body having a tapered axial opening therein, a standard mounted on said body at one side of said opening, a pair of frame members mounted for sliding action on said standard and adapted to be selectively supported on said standard for lateral swinging movement relative thereto, slip members pivotally supported on said frame members and movable therewith, said slip members having sets of teeth thereon, which teeth are arranged with the bite of the respective sets in opposed relation, means for securing said frame members together to cause normal engagement of both sets of teeth with said pipe, one set of said teeth being adapted for engagement with said pipe upon engagement of said slips with said tapered axial opening to prevent the downward movement of said pipe, the other set of teeth being positioned to engage more firmly with the pipe upon upward movement of said pipe to cause a lifting action of said slips with said pipe and means for causing the forcible separation of said slips after said slips have traveled upward above the upper surface of said body.

10. In pipe slips for handling pipe in a well, a base having an axial opening therein, an upstanding standard at one side of said axial opening, a movable element mounted on said standard and adapted to be moved upward and downward relative thereto, a pair of arms pivotally supported on said movable element, a segmental slip member pivotally mounted on one of said arms and forming a center slip element in alignment with said axial opening in said base, segmental slip sections pivotally mounted on opposite sides of said center element for relative lateral movement therewith, torsional springs surrounding said pivotal means of said slips tending to urge said segmental slip sections laterally outward relative to said center segment slip element, said elements being mounted for raising and lowering movements relative to said base, and means for gripping a pipe in said base upon lowering said slip elements into said axial opening.

11. In a device of the character described, in combination, slip members and a slip holding member having a tapered axial opening therein, an upright standard positioned at one side of said axial opening, a pair of vertically movable arms pivotally mounted on opposite sides of said opening from said standard and pivotally supporting said slip members thereon, latch means for securing said arms together about said upright standard, said latching means including releasing means, a trip member on said standard in the path of said releasing means, a cam member on said standard in the path of said arms, said slip members being adapted to bindingly engage a pipe when said arms are in latched position and adapted to move upward with said pipe until said arms engage said cam member and said latch releasing means engages said trip member on said standard to cause the release of said latch and the opening of said arms to release said slip members from said pipe.

12. In a pipe gripping mechanism, the combination of a body having an axial opening therethrough through which a pipe or the like is adapted to extend, a supporting frame mounted on said body adjacent said opening, a group of slip members surrounding said opening so as to embrace a pipe passing therethrough; a pair of arms pivoted for horizontal swinging movement toward and from each other, carried by said supporting frame, and supporting said slip members for movement toward and from said body, latching means for connecting said arms and thus causing said slip members to bindingly engage said pipe, said latching means including releasing means, fixed tripping means disposed at a predetermined distance from said body in the path of said releasing means and adapted to be struck by said last named means to automatically release said latching means and release the grip of the slip members upon said pipe after the pipe and slip members have moved said predetermined distance.

13. In a pipe gripping mechanism, the combination of a body having a vertical axial opening therethrough through which a pipe or the like is adapted to extend, a supporting frame mounted on said body adjacent said opening, a group of slip members surrounding said opening so as to embrace a pipe passing therethrough, a pair of arms pivoted for horizontal swinging movement toward and from each other, and carried by said supporting frame, and supporting said slip members, for vertical movement toward and from said body, latching means connecting said arms and thus holding said slip members in pipe gripping position, said latching means including releasing means, a fixed abutment disposed at a predetermined distance above said body and adapted to be struck by said releasing means to automatically and positively release said latching means and by said arms to forcibly move the latter and the attached slip members apart to free the pipe after the pipe and slip members have moved said predetermined distance.

14. In a pipe gripping installation, a relatively fixed supporting base through which a pipe or the like is adapted to be raised and lowered, a standard mounted on said base at one side of said opening, a gripper assembly surrounding said pipe opening in position to embrace the pipe, means supporting said assembly for limited vertical movements upon said standard, said movements including positive movement in either direction when the assembly is grippingly engaged with said pipe and the pipe is moved in such directions, and also including free downward movement under the influence of gravity when it is released from said pipe, means on said base to cause the assembly to grip the pipe when the assembly falls to its lower limit of movement, means for retaining said gripper assembly in engagement with said pipe during upward movement of the latter to said limited extent, means positioned at said upper limit of movement and in the path of said last named means for releasing said gripping assembly from engagement with said pipe at the upper limit of movement, and means for automatically and positively latching said assembly against the force of gravity when the assembly reaches its upper limit of movement and is freed from said pipe.

15. In a pipe gripping installation, a relatively fixed body having an axial, vertical downwardly converging, conical opening therein through which a pipe or the like is adapted to be raised and lowered, a standard mounted on said body at one side of said opening, a gripper assembly surrounding said pipe opening in position to embrace the pipe, means supporting said assembly for limited vertical movements upon said standard, said movements including positive movement in either direction when the assembly is grippingly engaged with said pipe and the pipe is moved in such directions, and also including free downward movement under the influence of gravity when it is released from said pipe, said assembly comprising tapered expansible and contractible slip members adapted to embrace the pipe, the tapered walls of said opening acting upon the correspondingly tapered walls of said expansible and contractible slip members causing said members to firmly grip the pipe when the assembly falls to its lower limit of movement, means for retaining said gripper assembly in engagement with said pipe during upward movement of the latter to said limited extent, means positioned at said upper limit of movement and in the path of said last named means for releasing said slip members from engagement with said pipe at the upper limit of movement, a rack on the upper portion of said standard adjacent the upper limit of movement of said assembly, a spring pressed ratchet on said assembly adapted to engage said rack at said upper limit and latch the assembly in raised position against the force of gravity when the assembly is released from said pipe.

16. In a pipe gripping installation, a relatively fixed body having an axial, vertical, downwardly converging, conical opening therein through which a pipe or the like is adapted to be raised and lowered, a standard mounted on said body at one side of said opening, a gripper assembly surrounding said pipe opening in position to embrace the pipe, means supporting said assembly for limited vertical movements upon said standard, said movements including positive movement in either direction when the assembly is grippingly engaged with said pipe and the pipe is moved in such directions, and also including free downward movement under the influence of gravity when it is released from said pipe, said assembly comprising tapered expansible and contractible slip members adapted to embrace the pipe, the tapered walls of said opening acting upon the correspondingly tapered walls of said expansible and contractible slip members causing said members to firmly grip the pipe when the assembly falls to its lower limit of movement, means for retaining said gripper assembly in engagement with said pipe during upward movement of the latter to said limited extent, means positioned at said upper limit of movement and in the path of said last named means for releasing said slip members from engagement with said pipe at the upper limit of movement, means for automatically and positively latching said assembly against the force of gravity when the assembly reaches its upper limit of movement and is freed from said pipe, and means for manually releasing said second named latching means to permit the assembly to drop to again engage the pipe at said lower limit.

17. In a pipe gripping installation for use with pipe having an elevator attached at the upper end thereof for raising and lowering the pipe in the bore hole of a well, a relatively fixed body having an axial, vertical, downwardly converging, conical opening therein through which a pipe or the like is adapted to extend, a standard mounted on said body at one side of said opening, a gripper assembly surrounding said pipe opening in position to embrace the pipe, means supporting said assembly for limited vertical movements upon said standard, said movements including positive movement in either direction when the assembly is grippingly engaged with said pipe and the pipe is moved in such directions, and also including free downward movement under the influence of gravity when it is released from said pipe, said assembly comprising tapered expansible and contractible slip members adapted to embrace the pipe, the tapered walls of said opening acting upon the correspondingly tapered walls of said expansible and contractible slip members causing said members to firmly grip the pipe when the asesmbly falls to its lower limit of movement, means for retaining said gripper assembly in engagement with said pipe during upward movement of the latter to said limited extent, means positioned at said upper limit of movement and in the path of said last named means for releasing said slip members from engagement with said pipe at the upper limit of movement, means for automatically and positively latching said assembly to the upper portion of said standard against the force of gravity when the assembly reaches its upper limit of movement and is freed from said pipe, and a depressible trip means disposed at the upper end of said standard in position to be engaged by said elevator and movable downwardly into contact with said second named latching means for releasing the latter to drop the slip members into said axial tapered opening and causing them to grip and hold the pipe.

18. In a pipe gripping installation for use with pipe having an elevator attached at the upper end thereof for raising and lowering the pipe in the bore hole of a well, a relatively fixed body having an axial, vertical, downwardly converging, conical opening therein through which a pipe or the like is adapted to extend, a standard mounted on said body at one side of said openings, a gripper assembly surrounding said pipe opening in position to embrace the pipe means supporting said assembly for limiting vertical movements upon said standard, said movement including positive movement in either direction when the assembly is grippingly engaged with said pipe and the pipe is moved in such directions, and also including free downward movement under the influence of gravity when it is released from said pipe, said assembly comprising tapered expansible and contractible slip members adapted to embrace the pipe, the tapered walls of said opening acting upon the correspondingly tapered walls of said expansible and contractible slip members causing said members to firmly grip the pipe when the assembly falls to its lower limit of movement, means for retaining said gripper assembly in engagement with said pipe during upward movement of the latter to said limited extent, means positioned at said upper limit of movement and in the path of said last named means for releasing said slip members from engagement with said pipe at the upper limit of movement, means on the assembly for automatically and positively latching said assembly to the upper portion of said standard against the force of gravity when the assembly reaches its upper limit of movement and is freed from said pipe, a ring element supported at the top of said standard, said ring element surrounding said pipe in a position to be engaged by said elevator, and having limited vertical movement with respect thereto, a trigger on said ring element adapted to trip and release said second named latching means, resilient means urging said ring element upward, said resilient means adapted to be compressed when said ring element is struck by said elevator to permit the trigger to move downwardly and contact and trip the latching means, whereby upon release of said latching means the slip members drop into said tapered opening and grip and hold the pipe.

19. In a pipe gripping installation, a relatively fixed body having an axial, vertical, downwardly converging, conical opening therein through which a pipe or the like is adapted to extend, a slip supporting and guiding pedestal including said body as a base and further comprising at least two posts extending upwardly from said body alongside the opening therein, a gripper assembly guided for limited vertical movement on one of said pedestal posts, said assembly including a pair of pivoted arms extending upon respective opposite sides of the pipe opening, tapered slip members carried by the arms and adapted to embrace said pipe and to automatically contact and grip the pipe when they are wedgingly received within the tapered opening in the body at the downward limit of movement of said assembly, latching means for securing said arms together for maintaining the firm gripping relationship of the slip members on the pipe, whereby the assembly may be carried upwardly to its upper limit of movement when the pipe is raised; said latching means including releasing means, a trip element projecting from another of said pedestal posts near the upper end of the pedestal and adapted to trip said releasing means when the assembly is raised substantially to its upper limit of movement, and a cam element also projecting from said second named post and adapted to contact said arms and wedge them apart immediately said trip member has effected the release of the latching means, whereby said assembly is freed from the pipe, a ratchet lever on said assembly and co-operating means on said first named post adapted to be contacted by said ratchet lever to retain said assembly in raised position to prevent it falling into the opening in said body and again gripping the pipe.

20. In a pipe gripping installation for use with pipe having an elevator attached at the upper end thereof for raising and lowering the pipe in the bore hole of a well; a relatively fixed body having an axial, vertical, downwardly converging, conical opening therein through which a pipe or the like is adapted to extend; a slip supporting and guiding pedestal including said body as a base and further comprising at least two posts extending upwardly from said body alongside the opening therein; a gripper assembly guided for limited vertical movement on one of said pedestal posts, said assembly including a pair of pivoted arms extending upon respective opposite sides of the pipe opening, tapered slip members carried by the arms and adapted to embrace said pipe and to automatically contact and grip the pipe when they are wedgingly received within the tapered opening in the body at the downward limit of movement of said assembly; latching means for securing said arms together for maintaining the firm gripping relationship of the slip members on the pipe, whereby the assembly may be carried upwardly to its upper limit of movement when the pipe is raised; said latching means including releasing means, a trip element projecting from another of said pedestal posts near the upper end of the pedestal and adapted to trip said releasing means when the assembly is raised substantially to its upper limit of movement; and a cam element also projecting from said second named post and adapted to contact said arms and wedge them apart immediately said trip member has effected the release of the latching means, whereby said assembly is freed from the pipe; a ratchet lever on said assembly and cooperating means on said first named post adapted to be contacted by said ratchet lever to retain said assembly in raised position to prevent it falling into the opening in said body and again gripping the pipe; a resiliently mounted plate carried at the top of the pedestal and adapted to be struck by and depressed by the pipe elevator upon lowering of the pipe, and a tripping projection carried by said plate and adapted to release said retaining ratchet lever and permit the assembly to drop and again grip the pipe.

JOHN HART WILSON.

REFERENCES CITED

The following references are of record in the file of this patent:

UNITED STATES PATENTS

| Number | Name | Date |
| --- | --- | --- |
| 1,273,858 | Hiniker | July 20, 1918 |
| 1,574,404 | Moody | Feb. 23, 1926 |
| 1,656,864 | Martin | Jan. 17, 1928 |
| 1,971,473 | Zerbe et al. | Aug. 28, 1934 |
| 2,061,772 | McLagan | Nov. 24, 1936 |
| 2,065,130 | Grau et al. | Dec. 22, 1936 |
| 2,173,079 | Moody | Sept. 12, 1939 |
| 2,231,923 | Koen | Feb. 18, 1941 |
| 2,282,758 | Gallagher | May 12, 1942 |
| 2,287,432 | Kinzbach | June 23, 1942 |
| 2,290,799 | Brauer | July 21, 1942 |
| 2,340,597 | Kelley | Feb. 1, 1944 |